United States Patent [19]
Dysarz

[11] Patent Number: 4,934,723
[45] Date of Patent: Jun. 19, 1990

[54] ELEVATING WHEEL CHAIR WITH SAFETY FEET

[76] Inventor: Edward D. Dysarz, 11423 Triola La., Houston, Tex. 77027

[21] Appl. No.: 283,075

[22] Filed: Dec. 12, 1988

Related U.S. Application Data

[63] Continuation-in-part of Ser. No. 173,126, Mar. 25, 1988, Pat. No. 4,886,288.

[51] Int. Cl.$^5$ .............................................. B62M 1/14
[52] U.S. Cl. .............................. 280/250.1; 280/43.17; 280/304.1; 280/650; 280/657; 297/347
[58] Field of Search .............. 280/657, 42, 647, 43.24, 280/47.38, 47.4, 242.1, 249, 250.1, 287, 293, 298, 300, 304, 304.1; 248/188.2, 188.5; 297/347, 345, DIG. 4; 292/252; 5/81 R, 63, 64, 65; 254/93 R, 102

[56] References Cited

U.S. PATENT DOCUMENTS 2,790,484 4/1957 Pollack .............................. 280/47.4
3,123,400 3/1964 Paulson .............................. 297/347
4,542,918 9/1985 Singleton ..................... 280/304.1 X

FOREIGN PATENT DOCUMENTS 38073 10/1981 European Pat. Off. ......... 280/304.1
473579 7/1969 Switzerland ..................... 280/250.1

*Primary Examiner*—Charles A. Marmor
*Assistant Examiner*—Tamara L. Finlay

[57] ABSTRACT

A device and method that will safely elevate a wheel chair to a greater height, hold the wheel chair in a safe elevated position and allow a person confined to the wheel chair to achieve the height of that of a standing person. The feet of the wheel chair are first rotated outward and lowered onto the floor, the wheel chair is then elevated by air pressure to a desired height and locked off for safety. When the wheel chair is being elevated or lowered, it will automatically lock off if the chair becomes unlevel for any reason.

23 Claims, 13 Drawing Sheets

ELEVATING WHEEL CHAIR WITH SAFETY FEET

CROSS REFERENCE TO RELATED APPLICATIONS

This application is a continuation in part of U.S. patent application Ser. No. 07/173,126 filed Mar. 25, 1988, now U.S. Pat. No. 4,886,288 Edward D. Dysarz which is incorporated and by reference.

BACKGROUND OF THE INVENTION

1. Field of the Invention

The present invention relates to the wheel chairs and people that are unable to walk and are therefore confined to their wheel chairs. While a person may be capable of moving around their living quarters or work area on a wheel chair, they are unable to attain sufficient height to reach and work on counter tops, stove tops, cupboard shelves and work benches. The present invention has been found to be particularly useful for persons who are unable to support themselves on their legs or for persons who have no legs at all that must be elevated to standing heights. The present invention however is also useful to persons that are recovering from an illness or persons that are just too weak to stand for even short periods of time without risking a fall.

2. Description of Prior Art

The wheel chair is a useful and indispensable vehicle to move disabled persons from one location to another. Most people that are unable to walk or stand use a wheel chair during most of their waking hours. Today there are millions of wheel chairs in existence and in constant use.

Although a wheel chair is useful to persons that are unable to walk, it does have some limitations. One limitation to a wheel chair is that generally it has a low elevation or an elevation that allows a person to sit at a table while eating or to sit at a desk. The lower elevation does not give a person confined to a wheel chair the ability to work at a counter top, stove top, oven, work bench or reach a cupboard or a shelf.

In order to reach into a cupboard, a person in a wheel chair, must crawl out of the wheel chair, climb unto the counter top and reach into the cupboard; this is very dangerous and time consuming. If a person that is confined to a wheel chair must work on a counter or work bench, they must climb on to the counter or work bench and sit on the counter or work bench; this is also dangerous and it reduces the efficiency of the disabled person.

There are several types of elevating wheel chairs that have been developed in the past. One type of elevating wheel chair only elevates the seat part of the wheel chair. Another type of elevating wheel chair places disabled person into a standing position.

Two examples of the first type of wheel chair that elevates the seat and back rest of a wheel chair are shown in U.S. Pat. No. 3,882,949 issued to Anderson and U.S. Pat. No. 4,431,076 issued to Simpson. These wheel chairs elevate the disabled person but they do not stabilize the wheel chairs when they are elevated. When the wheel chair is elevated with the disabled person, the ability to balance the wheel chair is diminished and the hazard of falling over is increased.

The other type of elevating wheel chair is the type that allows the disabled person to be supported and held in a standing position. This type of elevating wheel chair is shown in U.S. Pat. No. 4,067,249 issued to Deucher; U.S. Pat. No. 4,076,304 issued to Deucher; U.S. Pat. No. 4,598,944 issued to Meyer and Nold. These wheel chairs place the disabled person in a standing position but they do not increase their balance and since they are elevated their balance is greatly decreased again causing a hazardous condition. This type of wheel chair is limited to dissabled persons that have the ability to support their body weight on their legs or spine and therefore cannot be used by many disabled persons.

Several other elevating wheel chair have been known and used before and are typical examples thereof are shown in U.S. Pat. No. 1,307,058 issued to McGrath; U.S. Pat. No. 2,374,182 issued to Duke; U.S. Pat. No. 2,459,066 issued to Duke; U.S. Pat. No. 2,530,544 issued to Schwantes; U.S. Pat. No. 2,546,765 issued to McKinley; U.S. Pat. No. 2,609,862 issued to Pratt; U.S. Pat. No. 2,792,052 issued to Johannesen; U.S. Pat. No. 2,866,495 issued to Diehl et al; U.S. Pat. No. 2,915,112 issued to Schwartz; U.S. Pat. No. 3,905,436 issued to Karchark Jr. et al; U.S. 15 Pat. No. 3,937,519 issued to Schoolden; and U.S. Pat. No. 3,953,054 issued to Udden et al. None of these devices, however, teach the elevating of a wheel chair while increasing the stability of the wheel chair.

SUMMARY OF THE INVENTION

The present invention is a highly efficient device that will allow a person confined to a wheel chair to be safely elevated to the desired height of a standing person thus enabling the person to reach the top of counters, work benches and most shelves and cupboards.

The wheel chair of the preferred embodiment is elevated on four feet that rotate from beneath the wheel chair to a position outside of the wheel base of the wheel chair. As the feet rotate outward they are also lowered to the floor or ground. When the feet are on the ground, the wheel chair is elevated above the ground to the desired elevation. Once the wheel chair is in the desired elevation it will automatically lock in place for safety. When the wheel chair is to be lowered, the valve on the wheel chair is turned to the lowering position and the wheel chair will be allowed to be lowered.

The wheel chair of the preferred embodiment has two other safety devices. One safety device is a ball stop that will not allow the wheel chair to be elevated or lowered on a sloping surface. If an attempt is made to lower the wheel chair on a sloping surface, the ball stops in and around the legs will lock the legs in place thus preventing the wheel chair from turning over. Another safety device is the safety belt that is composed of a series of flexible tubes with quick connect and disconnect fittings that will allow the person in the wheel chair to connect the fittings after they are in the chair and to disconnect the fittings when they wish to leave the wheel chair. When the safety belt is not fastened, the chair will not be allowed to move up or down.

BRIEF DESCRIPTION OF THE DRAWINGS

For further understanding of the nature and objects of the present invention, reference should be had to the following detailed description of the preferred embodiment thereof, taken in conjunction with the accompanying drawings, in which parts are given like numerals and wherein.

DETAILED DESCRIPTION OF THE PREFERRED EMBODIMENTS

The embodiments of the device and the method of the present invention may be used to elevate a wheel chair that is normally used to transport persons that are unable to walk, to a height relative to a standing person.

The superior elevating ability is accomplished by the use of hydraulic or pneumatic pressure reacting on the two or four cylinders that form the four legs of the elevating wheel chair. As air or fluid is forced into the cylinders, the pistons push the rods onto the floor and further cause the wheel chair to elevate.

Another object of the invention is to provide a safe base on which the wheel chair is to be elevated on.

Still another object of the invention is to provide a locking means that will safely hold the wheel chair in place as it is being elevated.

Yet another object of the invention is to provide a means to prevent the wheel chair from being elevated or lowered on an unlevel plane.

Yet another object of the invention is to provide a safety belt that will allow the wheel chair to be elevated or lowered only when fastened but will not allow the wheel chair to move when disconnected.

The preferred embodiment and the other embodiments place more emphasis on elevating a wheel chair but safety and the safety devices are equally important to the invention.

DEVICE AND ITS METHOD OF USE

Figure 1:
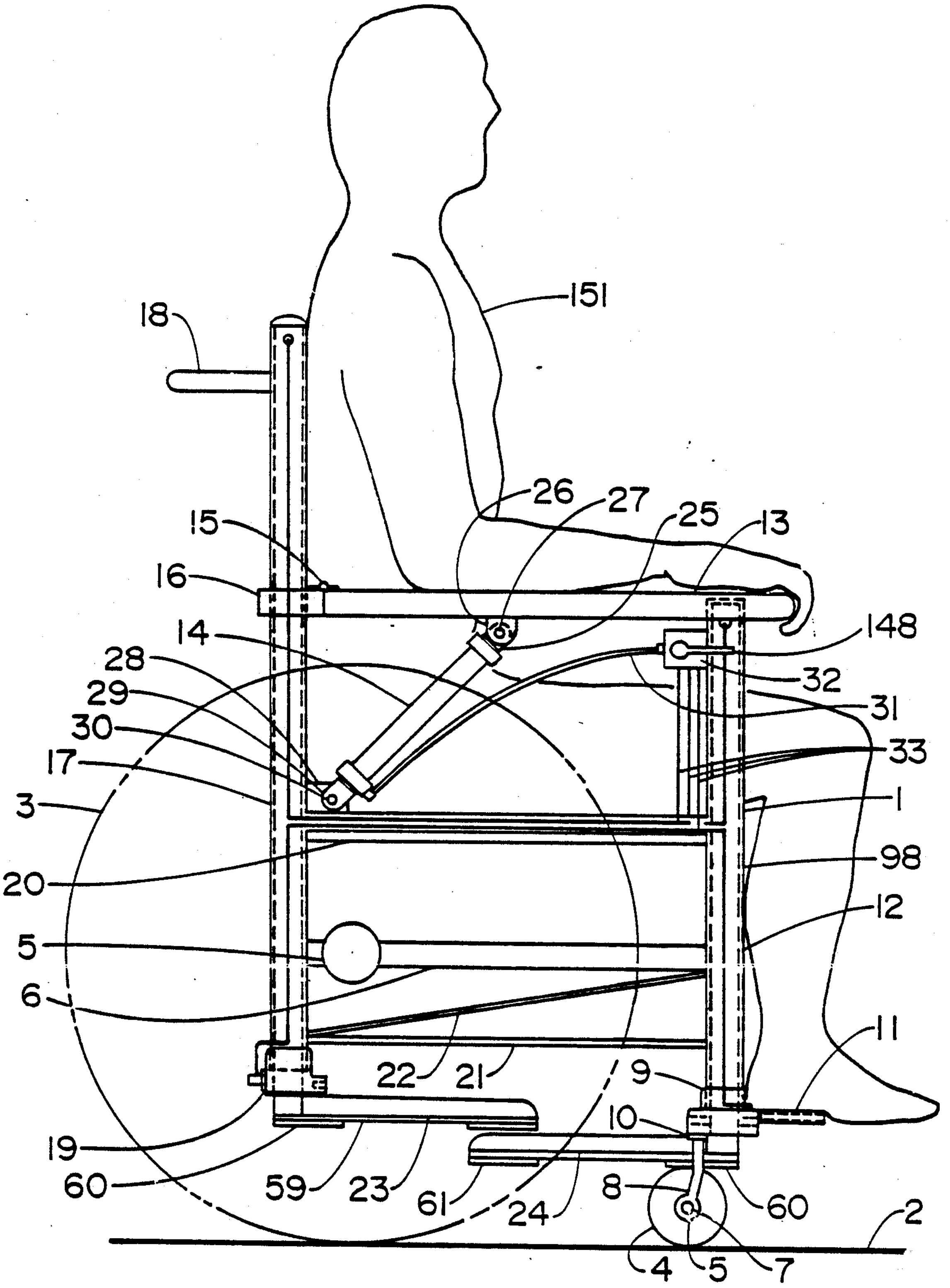
FIG. 1, is a side elevation view of the preferred embodiment of the apparatus of the present invention showing the wheel chair with the feet turned inward.

Referring to FIG. 1, there is shown an elevation view of the wheel chair 1 of the preferred embodiment. The wheel chair 1 is shown setting on a floor 2 or the ground or any surface that a wheel chair could operate on. The wheel chair 1 is also shown supporting a disabled person 151 on and above the floor 2.

The rear wheel 3 is not shown in detail but only a phantom outline is shown for clarity. The rear wheel 3 is a typical wheel chair wheel and it would be a matter of design choice as to what wheel is selected. The rear wheel 3 is supported on an axle not shown that is within the rear wheel axle housing 5. The rear wheel axle housing 5 is suitably fastened to a horizontal bar 6 which makes up part of the wheel chair 1. The means of fastening the rear wheel axle housing 5 to the wheel chair 1 or the horizontal bar 6 is a matter of design choice and is not shown in great detail.

The front wheel 4 is shown supported on the front wheel axle 7 which in turn is supported on the front wheel fork 8. The front wheel fork 8 is fastened to the front latch housing 9. The wheel fork 8 has a bearing 10 that allows the front wheel fork 8 to rotate as the wheel chair 1 is turned. The location of the front wheel fork 8 is a matter of design choice.

Also suitably attached to the front latch housing 9 is a foot rest 11. The foot rest 11 can be rotated out of the way as is typical on most wheel chairs. The rotation and the location of the foot rest 11 is a matter of design choice.

The front latch housing 9 is suitably fastened to the front vertical cylinder 12 which makes up part of the frame 149 of the wheel chair 1. The front vertical cylinder 12 extends from the front latch housing 9 to the right arm rest 13. The right arm rest 13 also acts as a pump handle to operate the hand pump 14. The right arm rest is suitably fastened to a hinge 15. The hinge 15 is suitably fastened to the right arm rest support 16 which is suitably fastened to the rear vertical cylinder 17.

At the top of the rear vertical cylinder 17 is a push handle 18. The push handle 18 is at this particular location to allow another person to push the wheel chair 1. It is a matter of design choice as to where the push handle 18 is located. At the bottom of the rear vertical cylinder 17 is the rear latch housing 19.

The rear vertical cylinder 17 and the front vertical cylinder 12 are rigidly connected together by the horizontal bar 6, the seat support bar 20, lower bar 21 and diagonal brace 22 to form frame 98. The location of these vertical and diagonal members and the means by which they are fastened to the front vertical cylinder 12 and the rear vertical cylinder 17 is a matter of design choice.

At the bottom of the rear latch housing 19 is a rear foot 23 that is turned in the direction of the front of the wheel chair 1. At the bottom of the front latch housing 9 is a front foot 24 that is shown turned in the direction of the rear of the wheel chair 1.

The rear foot 23 and the front foot 24 could be made of aluminum or graphite or some other suitable material. The sole plate 59 extends the entire length of each foot 23 and 24. There is also a heel 60 and a toe 61 made up of rubber on other suitable material.

The hand pump 14 is shown suitably mounted on the right arm rest 13 by a clevis 25 a bracket 26 and a pin 27. At the other end, the hand pump 14 is mounted on the rear vertical cylinder 17 by another bracket 28 a clevis 29 and a pin 30. This mounting means will allow the hand pump 14 to rotate freely around the pins 27 and 30 while the hand pump 14 is being operated. At one end of the hand pump 14 is a flexible tube 31 that is suitably fastened to a manifold 32. The manifold 32 is shown suitably fastened to the front vertical cylinder 12. There are various tubes 33 shown extending from the manifold 32 to the front latch housing 9, front vertical cylinder 12, rear vertical cylinder 17 and the rear latch housing 19. Air, hydraulic fluid or some other suitable medium will transport a force from the hand pump 14 through the flexible tube 31 into the manifold 32 where the force will be directed into a specific tube 33 to do a specific operation. The force is directed through the manifold 32 by the dial 148 located on the manifold 32 and into the necessary tubes 33 to do the desired work at a particular time.

Figure 2:
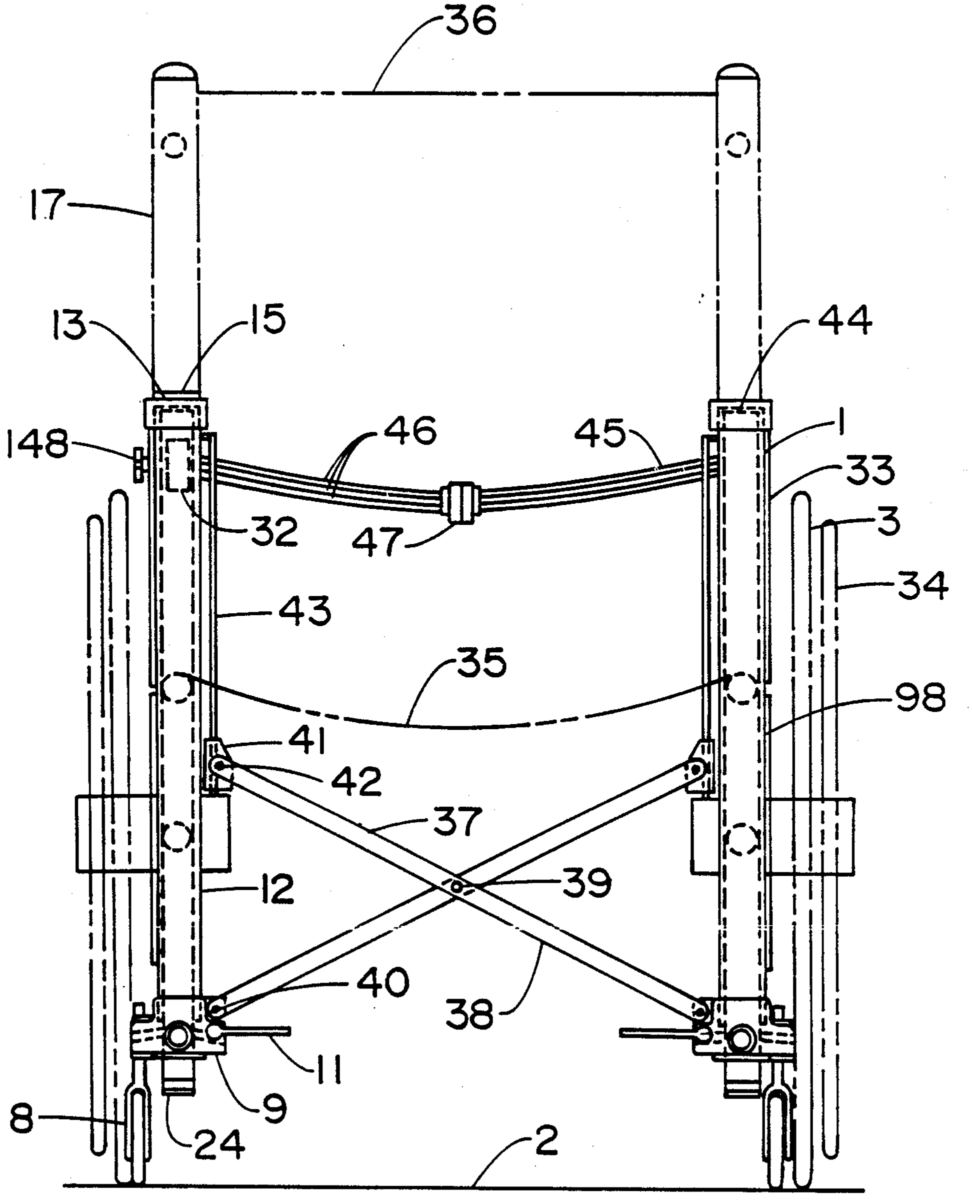
FIG. 2, is a elevation view of the front end of the wheel chair of the preferred embodiment of the present invention. The front end of the wheel chair is shown looking toward the rear end of the wheel chair.

Referring to FIG. 2, there is shown a front end view of the wheel chair 1 setting on the floor 2.

Shown again in a phantom outline are the rear wheels 3 and also shown in phantom are the turning bars 34 for the rear wheels 3. The turning bars 34 are used for gripping and forcing the wheels 3 to rotate and therefore propel the wheel chair 1 in the desired direction. The turning bars 34 are old in the art of wheel chair design and are therefore drawn in by design choice and for reference purposes.

Also shown in FIG. 2 is an outline of the seat 35 and the back rest 36. Both items are shown for reference purposes only and are therefore shown in phantom lines. It should be noted here however that this particular wheel chair design is for folding and therefore placing said wheel chair 1 in tight places such as in the rear seat of an automobile. The elevating ability of this invention can be used in both folding wheel chairs and non folding wheel chairs.

The wheel chair 1 of the preferred embodiment is a folding 25 wheel chair as noted above. In order to allow the wheel chair to fold or unfold a sliding x brace 37 is placed in the front or rear or at both ends of the wheel chair 1. The sliding x brace 37 is composed of two bars 38 that are joined together with a pin 39 near the center. At the lower end of each bar 38 another pin 40 connects the bar 38 with the font latch housing 9. At the other end of the bar 38 is the guide unit 41 that is fastened to the bar by still another pin 42. The guide unit 41 slides down on the rail 43 when the wheel chair 1 is opened and it also slides up on the rail 43 when the wheel chair 1 is folded.

The front latch housing 9 is shown suitably fastened to the front vertical cylinder 12. Also shown attached to the front latch housing 9 is the foot rest 11 and the front wheel fork 8. At the top of the front vertical cylinder 12 is the right arm rest 13, the hinge 15 and the left arm rest 44.

Before the wheel chair 1 is to be elevated, the seat belt 45 must be fastened. The seat belt 45 shown consists of three flexible hoses 46 and a quick connect and disconnect device 47 to latch and unlatch the seat belt 45. The flexible hoses 46 are fastened at one side to the manifold 32 and at the other side, they are fastened directly to the tubes 33 that run into the front vertical cylinder 12, the rear vertical cylinder 17, and the front latch housing 9. The seat belt 45 must be fastened before the wheel chair 1 can be elevated. If the seat belt 45 is not fastened and an attempt is made to elevate the wheel chair 1, the air in the pneumatic system will just be blown out of the open quick connect and disconnect device 47. If the seat belt 45 is not fastened when an attempt is made to lower the wheel chair 1, there will not be sufficient pressure to allow the wheel chair 1, to go down.

Also shown in hidden lines on FIG. 2, is the manifold 32 and the dial 33. There is also a front foot 24 shown at each lower end of the front latch housings 9.

The seat 35, the back rest 36, the sliding x brace 37, the bars 38, the left arm rest 44 and the rails of FIG. 2, combined with the rear wheel axle housing 5, the horizontal bars 6, the front wheel cylinders 12, the right arm rest 13 the rear vertical cylinders 17 the seat support bars 20, the lower bars 21 and the diagonal braces 22 of FIG. 1, combine to form the frame 98 of the wheel chair 1.

Figure 3:
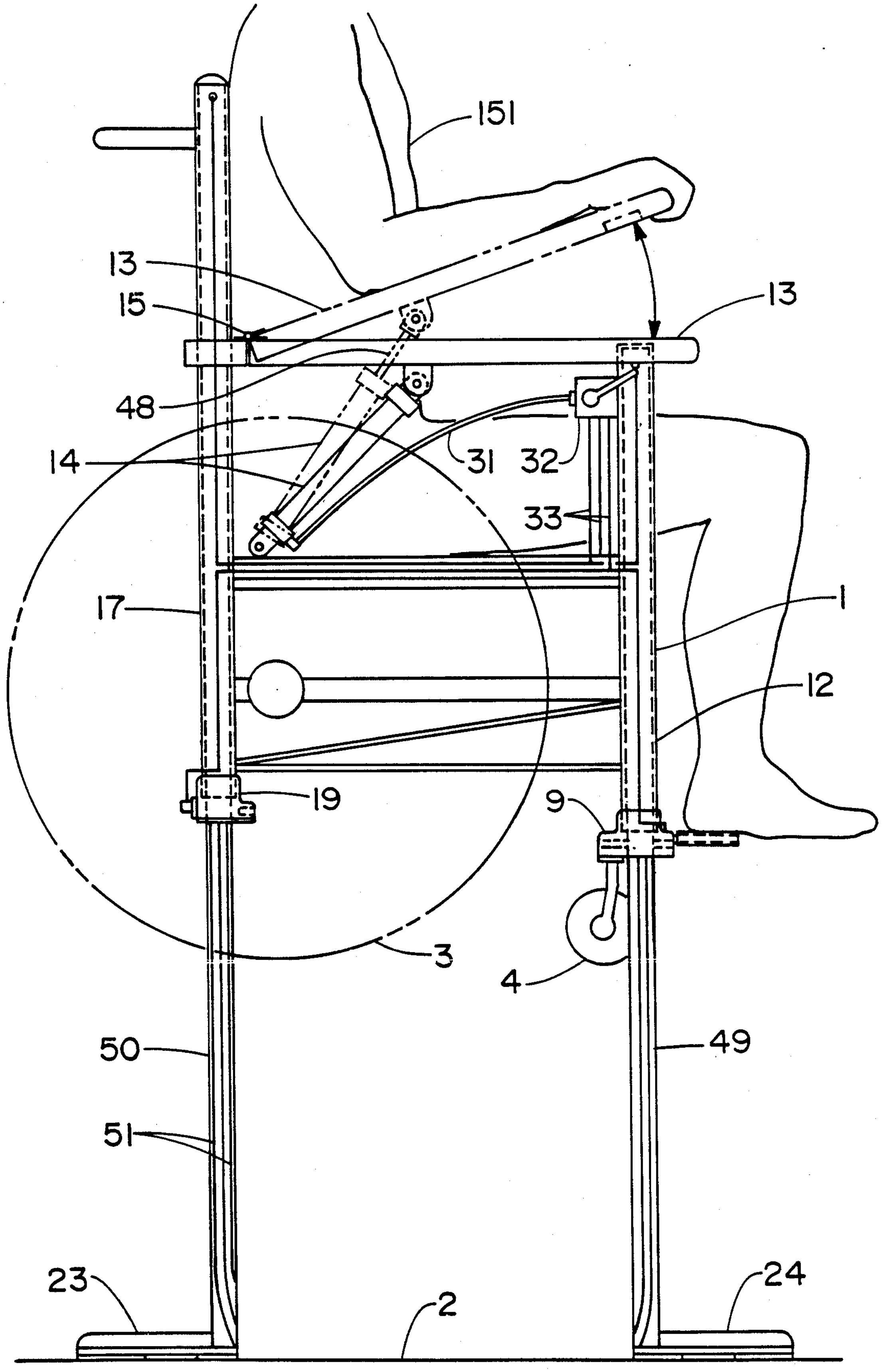
FIG. 3, is a side elevation of the preferred embodiment of the apparatus of the present invention showing the wheel chair in an elevated position.

Referring to FIG. 3 there is shown a side elevation view of the wheel chair 1 in an elevated position, supporting a disabled person 151 above the floor 2.

The front foot 24 and the rear foot 23 have been rotated from the inward position as shown in FIG. 1 to an outward position for greater balance and safety.

To elevate the wheel chair 1, the right arm rest 13 is pulled up and pushed down, causing it to rotate about the hinge 15. As the arm rest 13 moves up and down it causes the pump rod 48 to move in and out of the pump 14. This action causes air pressure to build up inside of the pump 14. The air pressure is forced from the pump 14 through the flexible tube 31 and into the manifold 32 where it is directed into the proper tube 33. When the air pressure enters the proper tube 33 it is forced into the front vertical cylinders 12 and rear vertical cylinders 17 causing the front leg 49 to be pushed out of the front vertical cylinder 12 and causing the rear leg 50 to be pushed out of the rear vertical cylinder 17. The internal details of the vertical cylinder and the legs will be further explained in FIG. 8. When the legs 49 and 50 are pushed out of the cylinders 12 and 17 the wheel chair 1 is forced to elevate to the desired height.

The front leg 49 and the rear leg 50 are shown with splines 51. The splines 51 are shown as splines, but they could also be grooves cut into the front leg 49 and the rear leg 50; this would be a matter of design choice.

When the front wheels 4 and the rear wheels 3 are still on the floor 2 and the front feet 24 and the rear feet 23 are still turned inward before the wheel chair 1 is elevated. Air pressure from pump 14 causes the legs 49 and 50 and the feet 23 and 24 to descend. As they descend, the splines 51 on the lower part of the legs 49 and 50 are curved around the legs 49 and 50. As the legs 49 and 50 are lowered the spiraled splines 51 cause the legs 49 and 50 to rotate, thus rotating the feet 23 and 24 into the desired position before they come to rest on the floor 2. The device that guides the splines 51 is contained within the front latch housing 9 and the rear latch housing 19 will further be explained in FIGS. 8 and 10.

Figure 4:
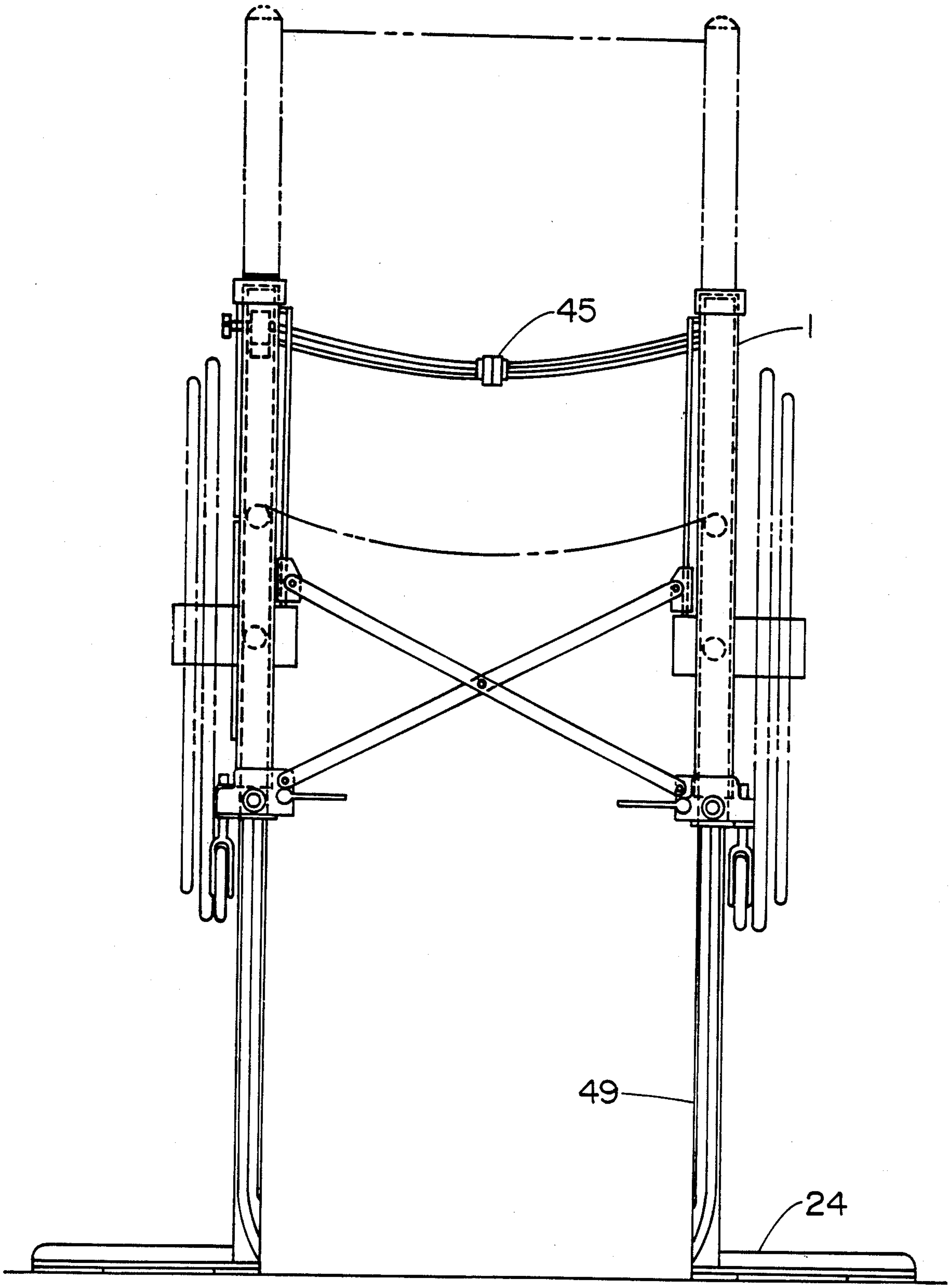
FIG. 4, is an elevation view of the front end of the wheel chair of the preferred embodiment of the present invention, shown in an elevated position.

Referring to FIG. 4 there is shown an elevation view of the front end of the wheel chair 1 in an elevated position.

The two front feet 24 are shown rotated outward for greater stability and safety. The front legs 49 are shown supporting the now elevated wheel chair 1. The seat belt 45 is shown fastened.

Figure 5:
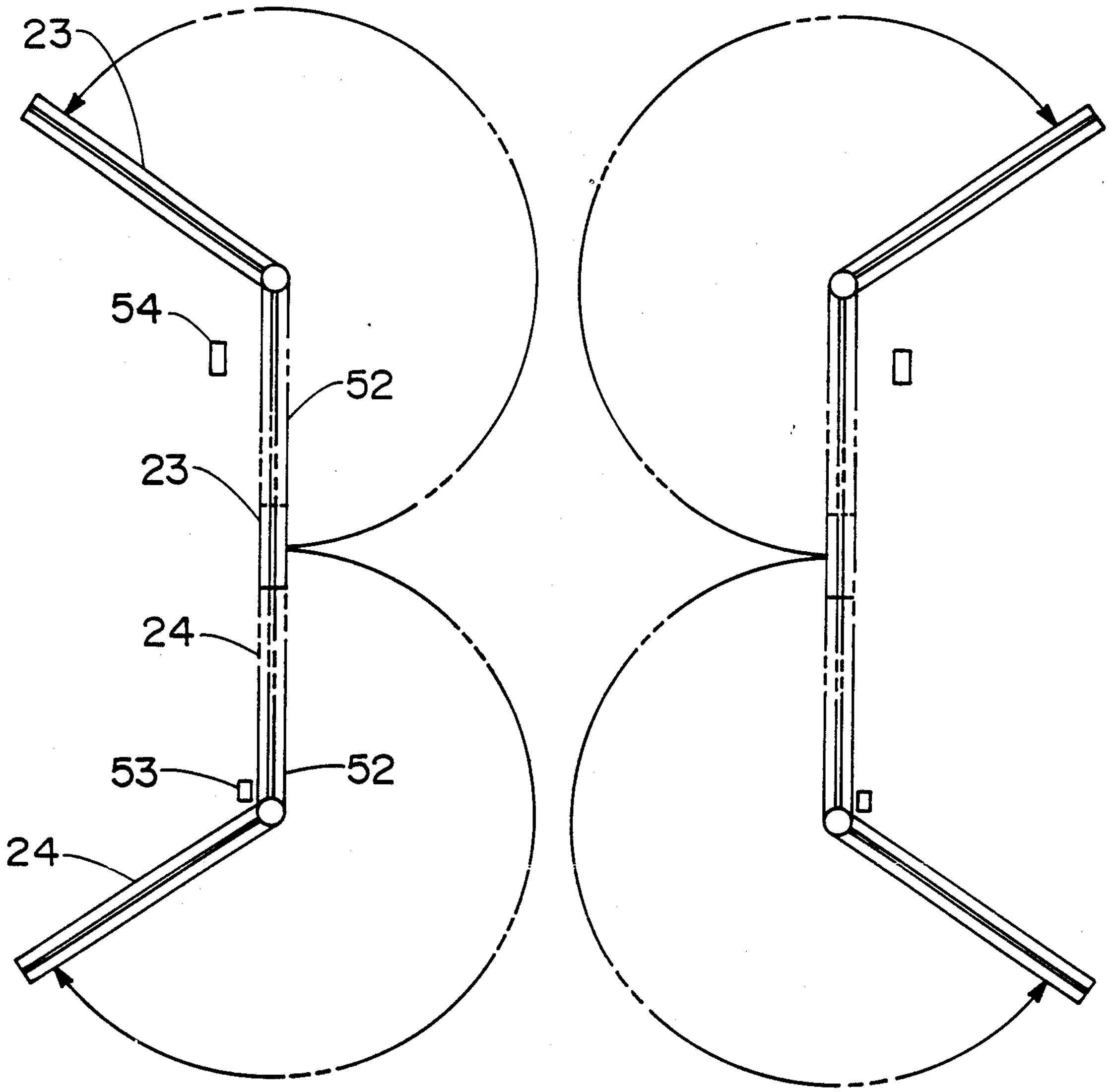
FIG. 5, is a plan view of the feet of the wheel chair of the preferred embodiment shown in their open and closed position relative to the wheels.

Referring to FIG. 5, there is shown a plan view of the feet 23 and 24 before they are rotated out and after they are rotated out.

The front feet 24 are shown in a closed position 52 inside of the front wheel footprints 53. The front feet 24 are shown to rotate toward the inside of the front wheel foot prints 53 and further rotate to a position outside of the front wheel footprints 53. The rear feet 23 are shown in a closed position 52 inside of the rear wheel foot-prints 54. The rear feet 23 are shown to rotate toward the inside of the rear wheel footprints 54 and further rotate to a position outside of the rear wheel foot prints 54.

The position of the front feet 24 and the rear feet 23 are for the greatest stability of the wheel chair when it is elevated. If even greater stability is required, the front feet 24 and the rear feet 23 can be lengthened and their positions can be changed. The location of the feet, the configuration of the feet and the opened position of the feet is a matter of design choice.

Figure 6:
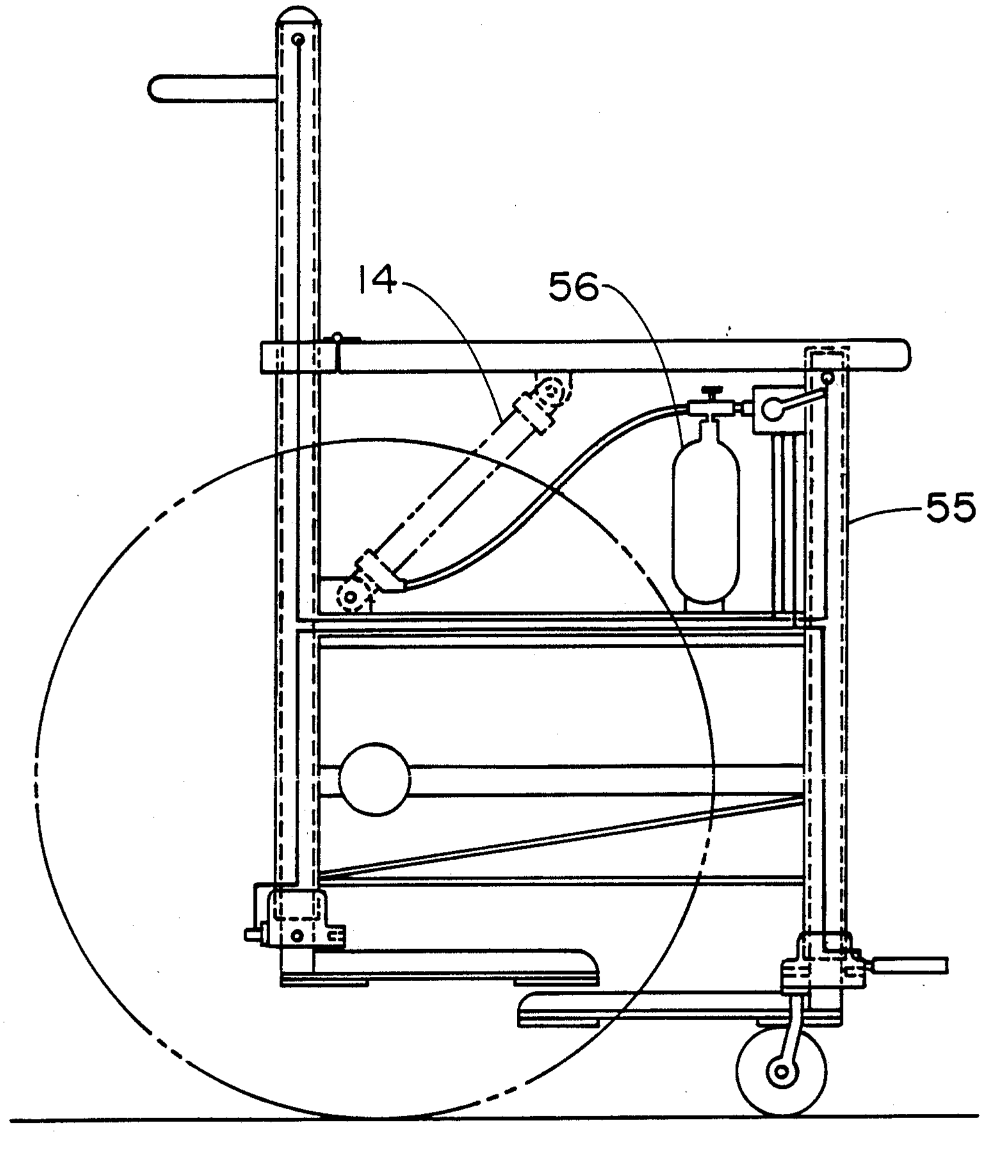
FIG. 6, is an elevation view of the wheel chair showing a pressure bottle.

Referring to FIG. 6, there is shown a wheel chair 55 with all of the same parts as the wheel chair 1 of FIG. 1 with the exception of the accumulator 56 that is an air pressure bottle that holds air pressure for later use. The accumulator could also be a CO2 cylinder or any device that holds air pressure for future work.

Also shown is the pump 14 that may be used to charge up the accumulator 56. The pump 14 could be an electric pump or a hand driven pump as shown. Whether the pump 14 is electric, hand driven or whether the pump should be used at all is a matter of design choice.

Figure 7:
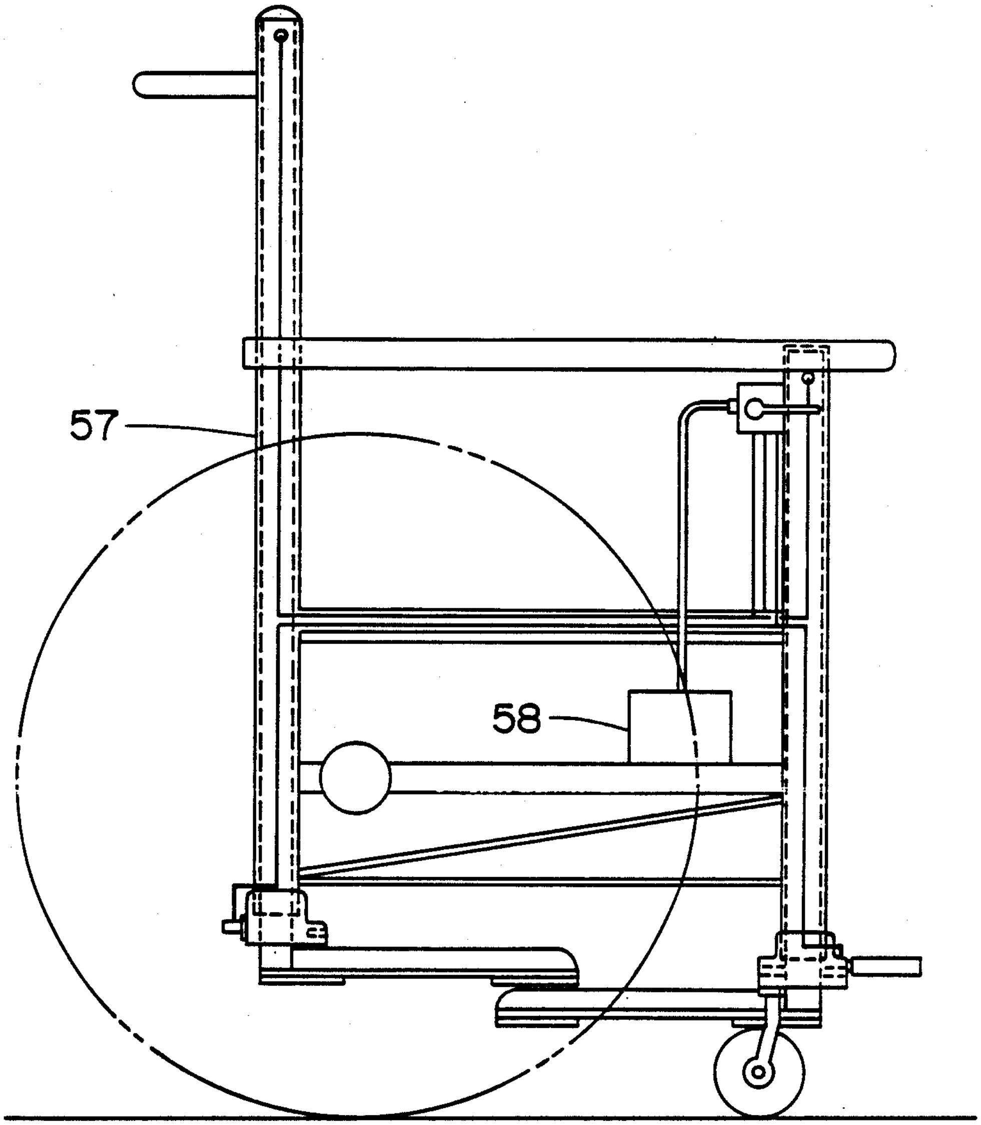
FIG. 7, is an elevation view of the wheel chair showing a pump.

Referring to FIG. 7 there is shown still another wheel chair 57.

The wheel chair 57 of FIG. 7 is again the same as wheel chair 1 of FIG. 1 however an electric pump 58 has been added. The electric pump 58 would be used to supply the air pressure necessary to elevate the wheel chair. The electric pump could be powered by a battery or an electric cord not shown plugged into an outlet.

The electric pump 58 could also be powered by an internal combustion engine with a generator; this would be a matter of design choice.

Figure 8:
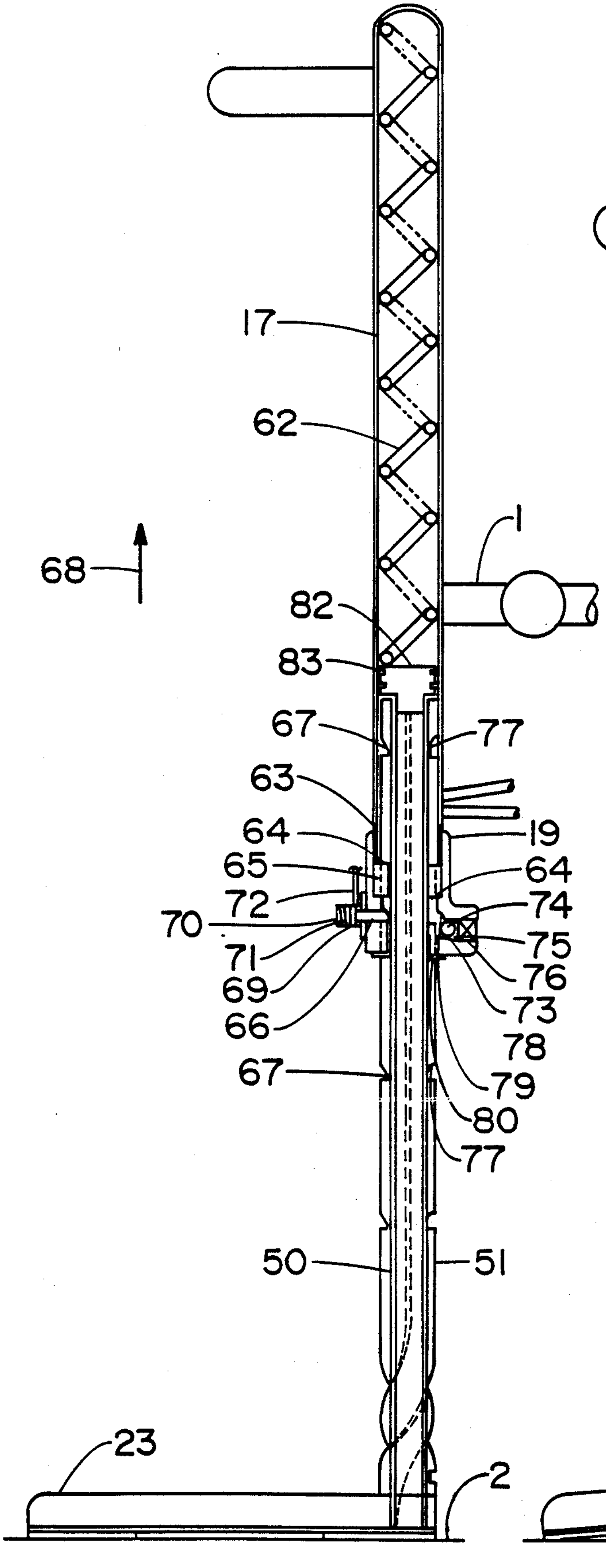
FIG. 8, is a section elevation of the preferred embodiment showing the details of the elevating means and the safety devices.

Referring to FIG. 8 there is shown a section elevation of the rear vertical cylinder 17 and the rear latch housing 19. Although the rear vertical cylinder 17 is shown in detail in FIG. 8 it should be noted that the front vertical cylinders 12 are essentially the same.

The rear foot 23 is shown setting firmly on the floor 2. The wheel chair 1 is in an elevated position. Part of the weight of the wheel chair 1 and its contents is bearing down on the rear leg 50.

The four splines 51 are shown more clearly on the rear leg 50. Three of the splines 51 are on the leg 50 for safety which will be further explained later, the forth spline 51 is for elevating means and for holding means. Another purpose of the splines 51 is to allow the legs 49 and 50 to be guided as they move up and down relative to the wheel chair 1.

The rear vertical cylinder 17 is shown with a spring 62 inside. The purpose of the spring 62 is to assist in elevating the wheel chair 1. The spring 62 is shown bearing down on the elevating piston 82. The elevating piston 82 has piston seals 83 wrapped around the elevating piston 82. The piston seals 83 are packers or rings that form an air-tight seal between the elevating piston 82 and the inside of the rear vertical cylinder 17. The elevating piston 82 is suitably fastened to the rear leg 50. When the rear vertical cylinder 17 is suitably pressurized with air pressure, the air pressure will force the elevating piston 82 down relative to the wheel chair 1 which will cause the wheel chair 1 to move in an upward direction 68. The elevating piston 82 is suitably fastened to the top of the rear leg 50.

At the lower end of the rear vertical cylinder 17 is the rear latch housing 19. The rear latch housing 19 is suitably fastened to the rear vertical cylinder 17 by threads 63 or by some other suitable means. Below the threaded connection is a washer 64 and below the washer 64 is a packer 65. The packer 65 is made of a soft rubber or soft plastic and forms an air tight seal around the rear leg 50, splines 51 and the inside wall of the rear latch housing 19. Below the packer 65 is another washer 64. The washers 64 support the packer 65 and allow the packer 65 to rotate freely within the rear latch housing 19.

Below the packer 65 is the latch bar 66. The latch bar 66 is a device that slides into the latching notches 67 as the wheel chair 1 moves in an upward direction 68. One end of the latch bar 66 is shaped to slide into the latching notches 67 and support the wheel chair 1 while in an elevated position. At the other end of the latch bar 66 is a latch piston 69. The latch piston 69 is contained in an air tight latch cylinder 70. The air tight latch cylinder 70 is suitably fastened to the rear latch housing 19.

The latch cylinder 70 is a pneumatic cylinder. On one end of the inside of the latch cylinder 70 is a latch spring 71. The latch spring 71 pushes against the latch cylinder 70 on one end, and the latch piston 69 on the other end. The latch spring 71 forces the latch piston 69 and the latch bar 66 into the latching notch 67 at all times. In order to withdraw the latch bar 66 from the latching notch 67, pneumatic pressure must be applied from the air line 72. The pneumatic pressure must be sufficient enough to overcome the force of the latch spring 71. When the pressure is great enough, it will push the latch piston 69 into the latch spring 71 and thereby push the latch bar 66 back and out of the latch notch 67.

Almost directly across the rear latch housing 19 from the latch bar 66 is the ball stop 73. The ball stop 73 is a safety device that will prevent the wheel chair 1 from moving up or down if it becomes unstable, or if it is on an unlevel surface.

The ball stop 73 consists of a ball 74 that is inside of a ball cylinder 75. The ball cylinder 75 is drilled or cut into the rear latch housing 19. The axis of the ball cylinder 75 is set at more than one (1) degrees off of horizontal or level. The ball 74 is held inside of the ball cylinder 75 and will rest against the plug 76 when the wheel chair 1 is a on level surface. At the other end of the ball cylinder 75 is a spline 51 with stop notches 77 cut into it. At the top portion of the ball cylinder 75 located near the spline 51 is a ball notch 78 which is similar to the shape of the ball bearing 74 but slightly greater in diameter.

Below the ball cylinders 75 and the latch bar 66 is the leg guides 79. The leg guides 79 are slots cut into the rear latch housing 19. The leg guides 79 allow the splines 51 and rear leg 50 to move vertically while controlling the rotation of the rear leg 50.

Below the leg guides 79 is a wiper blade 80. The wiper blade 80 is a rubber strip or some other suitable material that cleans the rear leg 50 and splines 51 as they move up and down.

Although the specifications of FIG. 8 pertain to a rear latch housing 19 and a rear vertical cylinder 17 of the wheel chair 1 they are also applicable to the front latch housing 9 and the front vertical cylinder 12. The details of FIG. 8 are enlarged for clarity in FIG. 10.

Figure 9:
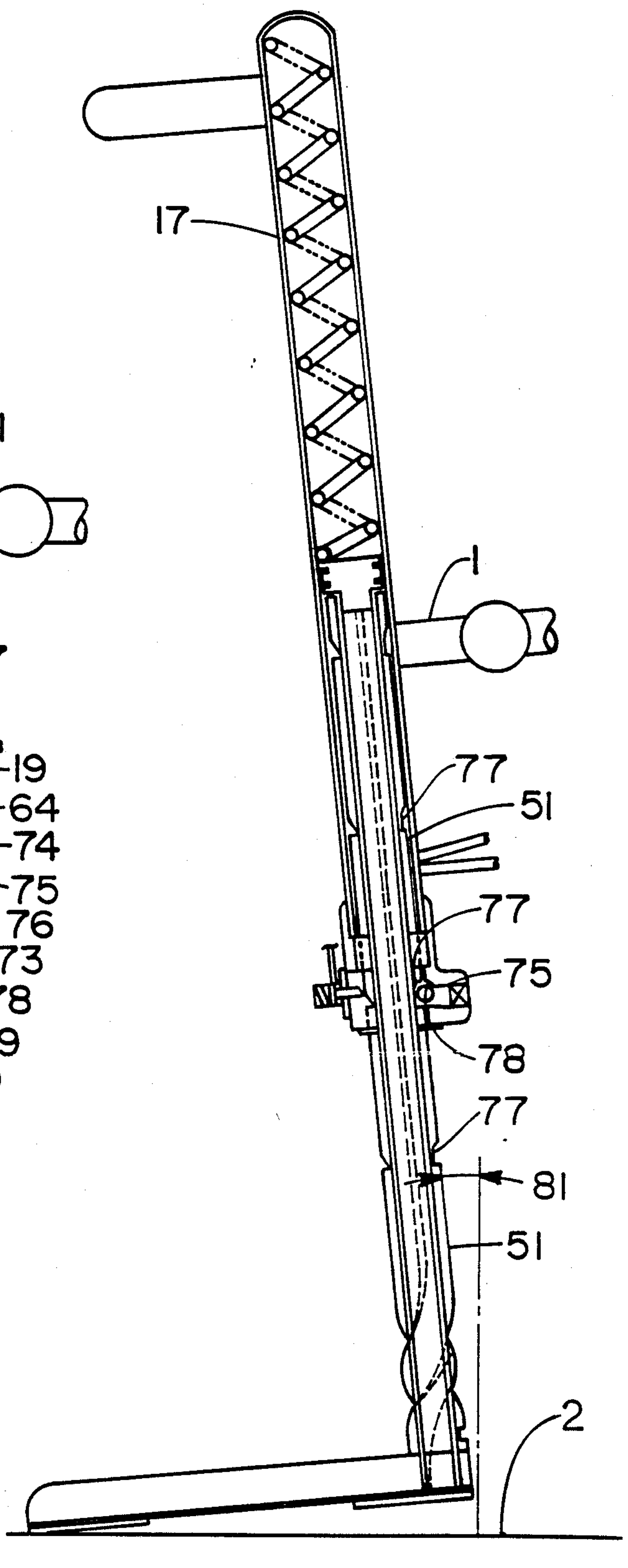
FIG. 9, is a section elevation of the preferred embodiment showing the details and function of the apparatus while the apparatus is operating on an unsafe slope.

Referring to FIG. 9, there is shown the rear vertical cylinder 17 on a slope 81. The slope 81 could be caused by the wheel chair 1 being lowered when a front leg accidently locks up and will not lower the wheel chair 1. An uneven slope 81, will result.

As the wheel chair 1 slopes 81 in one direction the ball cylinder 75 will slope toward the spline 51 and the stop notch 77. This slope will cause the ball 74 to roll into the stop notch 77 and be caught between the stop notch 77 and the ball notch 78 thereby causing the ball 74 to lock up the stop notch 77 and the ball notch 78 thus preventing the rear vertical cylinder 17 and the wheel chair 1 from further descending until the slope 81 is removed or corrected. The slope 81 can be removed by elevating the rest of the wheel chair 1 until it is level.

Figure 10:
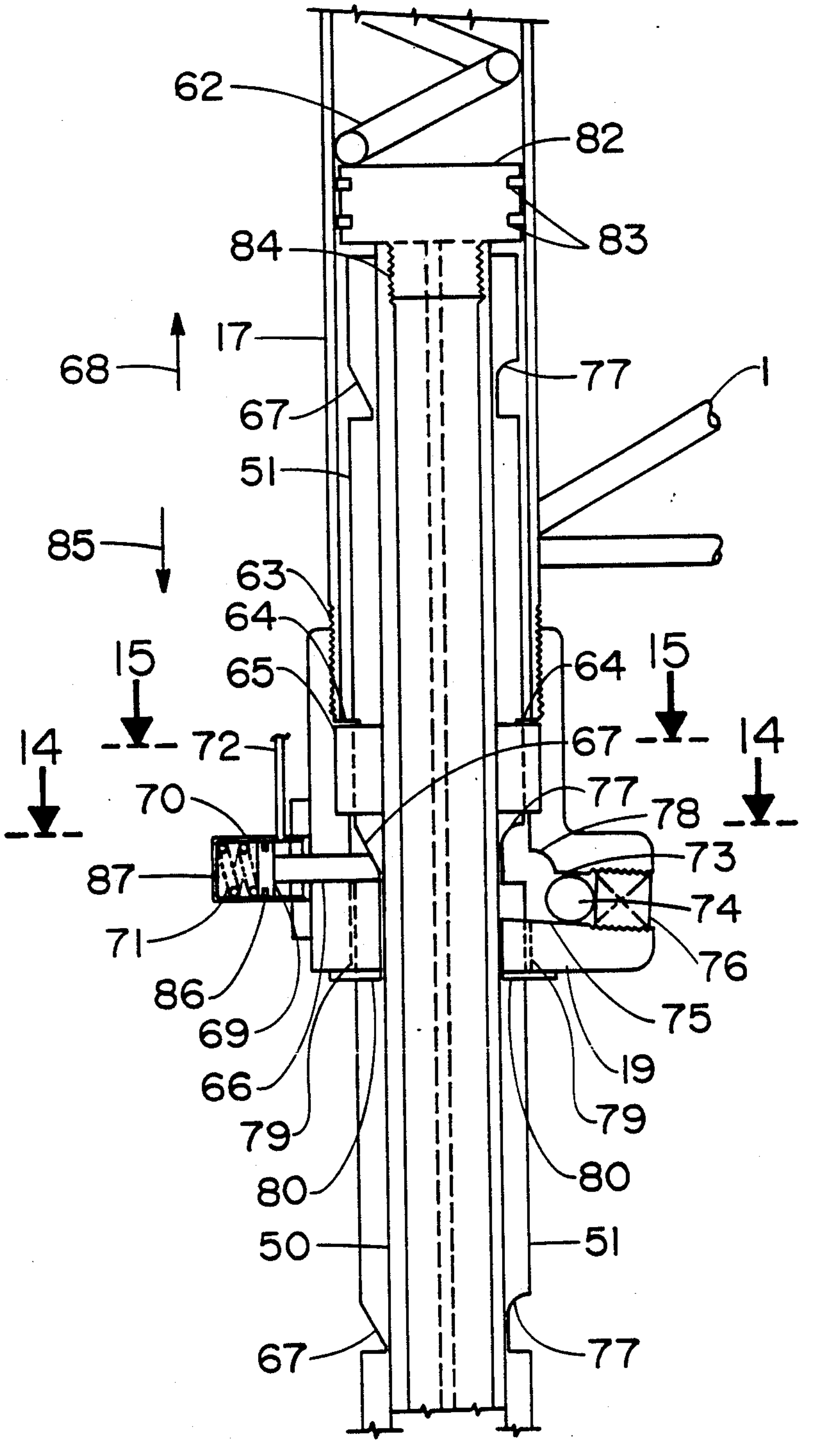
FIG. 10, is an enlarged section elevation of the preferred embodiment, taken from FIG. 8, showing the mechanical details of the apparatus.

Referring to FIG. 10 there is shown an enlarged section elevation of the rear latch housing 19 part of the rear leg 50 and the lower part of the rear vertical cylinder 17.

The rear vertical cylinder 17 is shown fastened to the rear latch housing 19 by threads 63 however welding or other suitable means could be used. The lower part of the spring 62 is shown pushing down on the elevating piston 82. The elevating piston 82 has piston seals 83 wrapped around it to form an air tight seal between the rear vertical cylinder 17 and the elevating piston 82.

The elevating piston 82 is fastened to the rear leg 50 by threads 84 or other suitable means not shown. Suitably fastened to the rear leg 50 are the splines 51. One spline 51 has latching notches 67 cut into it. The latching notches 67 are for the latch bar 66 to support the weight of the wheel chair 1 and its contents. On the other side of the spline 51 with the latching notches 67 is another spline 51 with stop notches 77 cut into it. The stop notches 77 are part of the safety system that will prevent the wheel chair from turning over.

The rear latch housing 19 is shown fastened to the bottom portion of the rear vertical cylinder 17. Directly below the rear vertical cylinder 17 and inside of the rear latch housing 19 is a washer 64. The washer 64 is used to retain the packer 65. There, is another washer 64 at the lower most end of the packer 65 which also is used to retain the packer 65. The two washer 64 will allow the packer 65 to rotate some as the rear leg 50 rotates. The rear packer 65 forms an airtight seal between the rear leg 50, the spline 51 and the rear latch housing 19.

Below the rear packer 65 is the latch bar 66. The latch bar 66 is shown inserted into a latching notch 67 in the spline 51. The latch bar 66 is forced or pushed into the latch notch 67 by the latch spring 71. If the wheel chair 1 is moving in an upward direction 68, the latch bar 66 is so sloped on the end to cause it to push against the slope of the latching notch 67 and it will thus be pushed back. If the wheel chair 1 is moving in a downward direction 85 the latch spring 71 will hold the latch bar 66 in the latching notch 67 thus preventing movement in a downward direction 85. To move in a downward direction 85 pressure must be applied to the latch cylinder 70 through the air line 72 thus pushing on the latch piston 69 with sufficient force to overcome the force of the latch spring 71. The latch piston 69 has a piston seal 86 around it to form an air tight seal between the latch cylinder 70 and the latch piston 69. Any air trapped between the latch piston 69 and the latch cylinder 70 will be vented through the latch orifice 87.

Across from the latch bar 66 is the ball stop 73 which is a safety device that will prevent the wheel chair 1 from tipping over under various unsafe conditions.

The ball stop 73 consists of a ball cylinder 75 formed in part of the rear latch housing 19. The ball cylinder 75 is formed on a slight angle slopping away from the rear leg 50 when the rear leg 50 is level or perpendicular relative to a level surface. At one end of the ball cylinder 75 is a plug 76 that is threaded into the ball cylinder 75. The plug 76 retains the ball 74 in the ball cylinder 75. At the other end of the ball cylinder 75 is the ball notch 78. The ball notch 78 is a round notch with a diameter that is slightly greater than that of ball 74.

Below the latch bar 66 and the ball stop 73 are the leg guides 79. The leg guides 79 are short cuts into the lower most portion of the rear latch housing 19. The splines 51 pass through the leg guides 79 but the leg guides 79 prevent the rear leg 50 from rotating.

Below the leg guides 79 are the wiper blades 80. The wiper blades 80 wipe off dirt from the rear legs 50 and the splines 51 as the wheel chair 1 is moved up and down.

Figure 11:
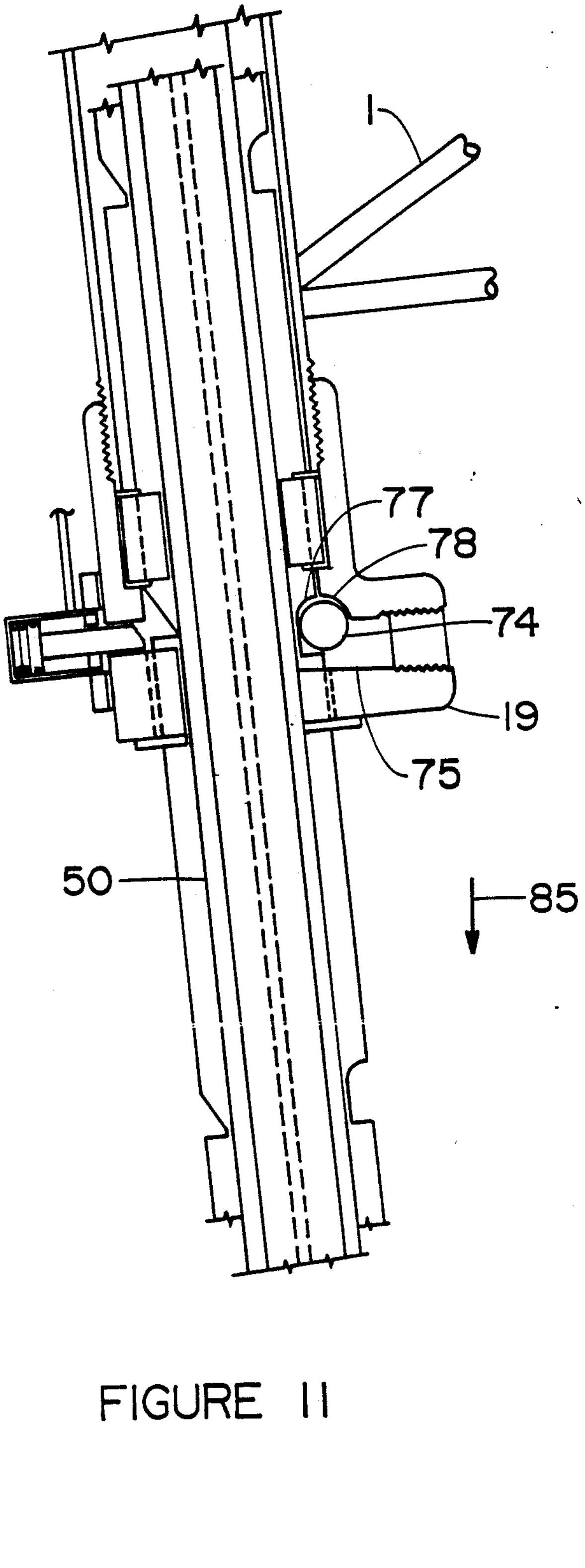
FIG. 11, is an enlarged section elevation of the preferred embodiment taken from FIG. 9, showing the mechanical details of the apparatus while on an unsafe slope.

Referring to FIG. 11 there is shown an enlarged section elevation of the wheel chair 1, the rear latch housing 19, and the rear leg 50 are shown on an unsafe slope.

The cause of the slope could have been due to something leaning on the wheel chair 1 as it was being lowered thus causing it to lean in one direction. As the slope of the wheel chair 1 is increased, the slope of the ball cylinder 75 is reversed from away from the direction of the rear leg 50 to slope in the direction of the rear leg 50. When the slope changes, the ball 74 will roll toward the rear leg 50 and will thus get caught in one of the stop notches 77 that is cut into the spline 51. When this happens, the ball 74 will lock itself into the stop notch 77 and the ball notch 78 thus preventing the wheel chair to continue moving in a downward direction 85 on that particular leg and further preventing the wheel chair from tipping over.

Figure 12:
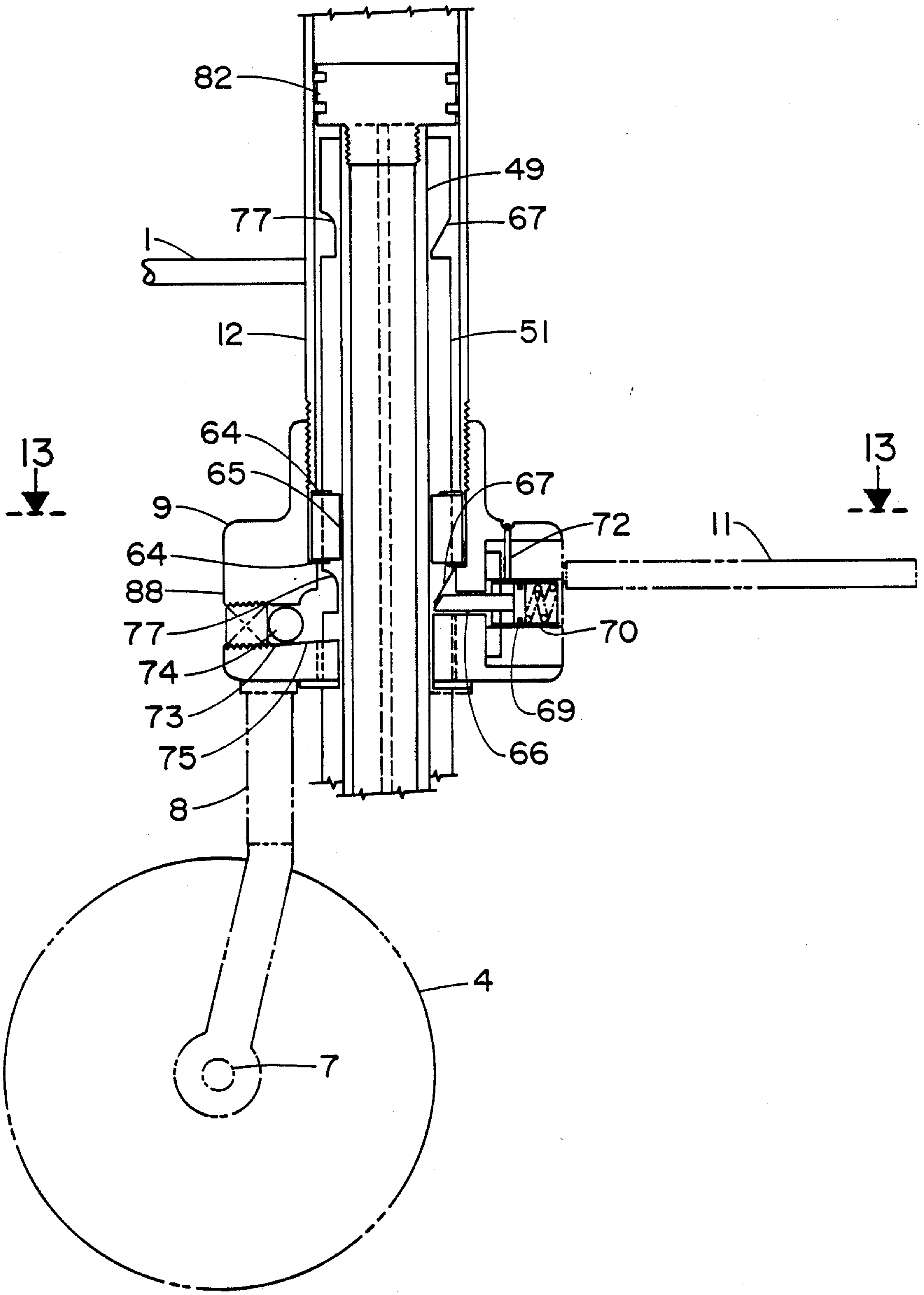
FIG. 12, is an enlarged section elevation of a front wheel of the wheel chair of the preferred embodiment.

Referring to FIG. 12, there is shown a section elevation of the front latch housing 9 and the lower part of the front vertical cylinder 12 of the wheel chair 1.

All of the elements that make up the rear latch housing etc. are equal and opposite in the front latch housing.

The front leg assembly 88 has an elevating piston 82 fastened to the front leg 49. The front leg 49 has splines 51 suitably fastened to it. The spline 51 on one side has latching notches 67 cut into it and the splines 51 on the other three sides have stop notches 77 cut into them. The latch bar 66 has a latch piston 69 inside of a latch cylinder 70 backed up by a latch spring. An air line 72 supplies air pressure to move the latch bar 66 in and out. There are two washers 64, one on the top of the packer 65 and the other at the bottom of the packer 65. On the other side of the front vertical cylinder 12 is the ball stop 73 with the ball 74 inside of the ball cylinder 75.

The front leg assembly 88 has a front wheel fork 8 suitably fastened to the front latch housing 9. The front wheel fork 8, supports the front wheel axle 7 that supports the front wheel 4. The front leg assembly 88 also supports a foot rest 11.

Figures 13, 14, 15:
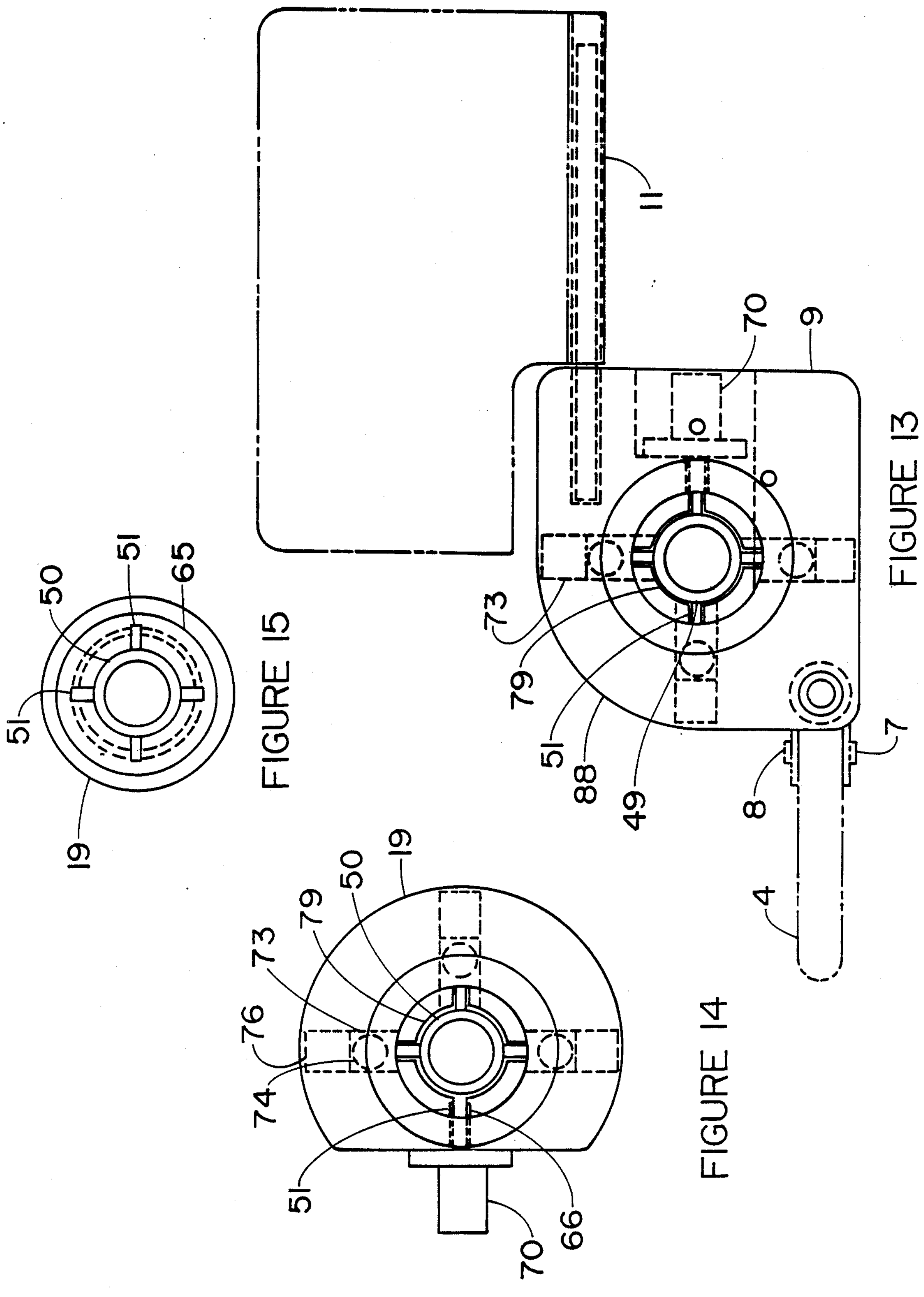
FIG. 13, is a section plan view taken through FIG. 12.
FIG. 14, is a section plan view taken through FIG. 10.
FIG. 15, is a section plan view taken through FIG. 10.

Referring to FIG. 13 there is shown a section plan view of the front leg assembly 88 as taken through FIG. 12.

The front leg 49 is shown with four (4) splines 51 fastened to it. The leg guides 79 are shown around the splines 51. The latch cylinder 70 is shown with hidden lines. The ball stops 73 are also shown with hidden lines. The front latch housing 9 is shown supporting the foot rest 11 on one side and the front wheel 4, the front axle 7 and the front wheel fork 8 are shown on the other side.

Referring to FIG. 14 there is shown a section plan view of the rear latch housing 19 as taken through FIG. 10.

The rear leg 50 is shown with four (4) splines 51 fastened to it. On one spline 51 there is shown the latch bar 66 and the latch cylinder 70. On the other three splines 51 there is shown three ball stops 73, with the balls 74 at rest against the plugs 76. The leg guides 79 are shown as slots cut in way of the splines 51.

Referring to FIG. 15 there is shown a section plan view of the upper part of the rear latch housing 19 as taken through FIG. 10.

The rear leg 50 is shown with four splines 51 fastened to it. The packer 65 is shown tightly compressed around the rear leg and splines 51 forming an airtight packer 65 between the rear leg 50, the splines 51 and the inside of the rear latch housing 19.

Figure 16:
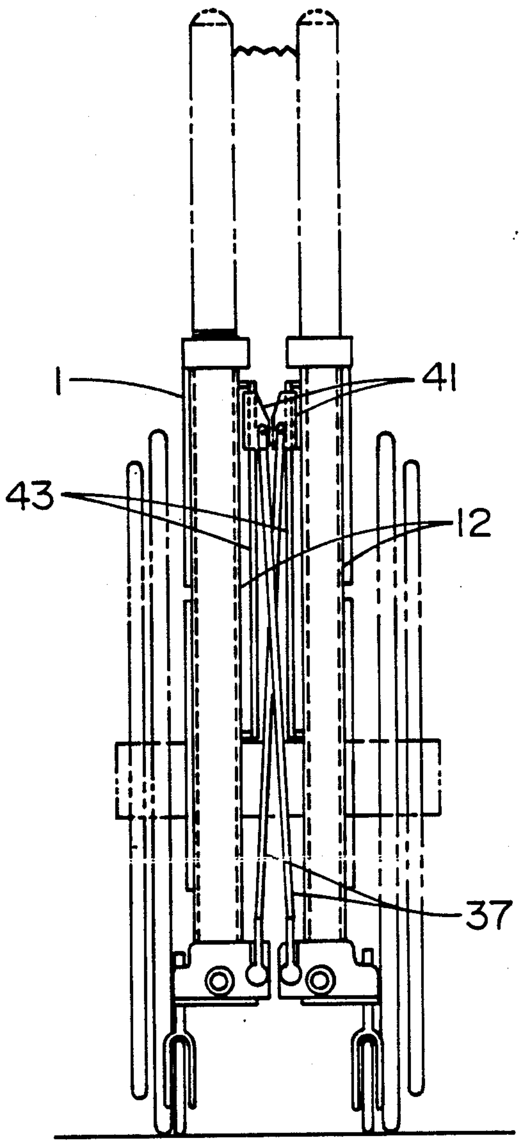
FIG. 16, is an elevation view of the wheel chair of the preferred embodiment shown in a folded position.

Referring to FIG. 16 there is shown the wheel chair 1 of the preferred embodiment in a folded position.

The guide units 41 have been moved up on the rails 43 on both side causing the sliding X brace 37 to become almost vertical. The two front vertical cylinders 12 are moved closer together.

Although the system described in detail supra has been found to be most satisfactory and preferred, many variations in mechanics, structure and method are possible. For example, rollers could be used instead of balls, hydraulics could be used instead of pneumatics, electric motors with worm gears could be used to elevate the wheel chair rather than pneumatics. The folding wheel chair of the preferred embodiment could be a nonfolding wheel chair.

The above are exemplary of the possible changes or variations because many varying and different embodiments made within the scope of the inventive concept herein taught and because many modifications may be made in the embodiments herein detailed in accordance with the descriptive requirements of law, it should be understood that the details herein are to be interpreted as illustrative and not in a limiting sense.

What is claimed as invention is:

1. A wheel chair for transporting and supporting a disabled person on and above a floor and further elevating said wheel chair while said disabled person remains supported by said wheel chair comprising;

a frame, said frame formed by structural members, forming the inner and outer vertical and horizontal peripheries of a chair;

wheel means mounted on said frame for supporting said frame on said floor forming a wheel chair and further allowing said wheel chair to transport said disabled person;

at least one elevation means, with a lower end said elevation means is connected to said frame and further forming part of said frame;

at least one leg means, with an upper part and a lowermost part connected to said elevation means for elevating and lowering and supporting said frame, said wheel means and said disabled person;

said leg means including at least one spline connected to said leg means, said spline extending from near the upper part of said leg means and further extending down said leg means parallel to the vertical axis of said leg means to near the lowermost part of said leg means wherein said spline is curved around a part of said leg means;

a guide means, said guide means connected to the lower end of said elevation means, said guide means for engaging said spline and for guiding said leg means as said leg means is being elevated and lowered;

a foot fixed to the lower end of said leg means for supporting and stabilizing said wheel chair while said wheel chair is elevated;

said foot is rotated to a position below said wheel chair while said wheel chair is not elevated, and said foot is further rotated in a direction away from said outer horizontal and vertical peripheries of said wheel chair to stabalize said wheel chair as said wheel chair is being elevated and while said wheel chair is elevated.

2. The wheel chair of claim 1 wherein said wheel chair is elevated with pneumatic power means.

3. The wheel chair of claim 1 wherein said wheel chair is elevated with hydraulics power means.

4. The wheel chair of claim 1 wherein said elevation means is assisted with a spring.

5. The wheel chair of claim 2 wherein said pneumatic power is supplied by a hand pump.

6. The wheel chair of claim 2 wherein said pneumatic power is supplied by an electric pump.

7. The wheel chair of claim 2 wherein said pneumatic power is supplied by an accumulator.

8. The wheel chair of claim 2 wherein said pneumatic power is controlled and directed by a manifold and a dial.

9. The wheel chair of claim 1 wherein said wheel chair includes an arm rest fastened to said wheel chair by a hinge.

10. The wheel chair of claim 9 wherein said arm rest is also fastened to a pump.

11. The wheel chair of claim 10 wherein said arm rest is a handle for said pump.

12. The wheel chair of claim 1 wherein said frame has an X brace that will stabilize said wheel chair while said wheel chair is open and will further allow said wheel chair to be folded together for storage.

13. A wheel chair for transporting and supporting a disabled person on and above a floor and further elevating said wheel chair while said disabled person remains supported by said wheel chair comprising;

a frame, said frame formed by structural members, forming the inner and outer vertical and horizontal peripheries of a chair;

wheel means, mounted on said frame for supporting said frame on said floor and further allowing said wheel chair to transport said disabled person;

an elevation means, with an uppermost portion and a lowermost portion and further said elevation means, is connected to and is part of said frame;

at least one leg means, said leg means, with an uppermost part and a lowermost part, connected to said elevation means for elevating and lowering and supporting said frame, said wheel means and said disabled person;

said leg means including at least one spline connected to said leg means, said spline extending from near said uppermost part of said leg means and extending down said leg means parallel to the vertical axis of said leg means, to near the lowermost part of said leg means;

said spline further including at least one latching notch cut into said spline;

a latch housing fixed to said lowermost portion of said elevation means;

a latch cylinder, said latch cylinder is fixed to said latch housing at one end;

a latch piston, said latch piston is slideably held inside of said latch cylinder;

a latch bar, said latch bar having a first end and a second end, said first end essentially conforming to the configuration of said latching notch, and said second end is connected near the center of said latch piston;

a latch spring, said latch spring having two ends and is bearing on one said end on said latch cylinder, and said latch spring is further bearing on the other end on said latch piston, pushing said latch piston into said latch bar and further pushing said latch bar into said spline and into said latch notch wherein said latch bar will be locked into said latch notch and further supporting said wheel chair and further preventing said wheel chair from moving downward.

14. The wheel chair of claim 13 wherein said wheel chair can be elevated with pneumatic force.

15. The wheel chair of claim 13 wherein said wheel chair can be elevated with hydraulic force.

16. The wheel chair of claim 13 wherein said latch bar is sloped at a top part of said latch bar to conform with a slope of said latch notch to allow said latch bar to be moved up while said latch bar is extended but will not allow said latch bar to move down while said latch bar is extended.

17. The wheel chair of claim 13 wherein said latch cylinder has an air line fixed to said latch cylinder, said air line to carry compressed air to said latch cylinder and further push against said latch piston and to push against said latch spring and to further overcome the force of said latch spring and to further push back said latch piston and said latch bar and further removing said latch bar from said latch notch cut in said spline thus allowing said wheel chair to be lowered on said elevating system.

18. The wheel chair of claim 13 wherein said air line will transport hydraulic fluid under force.

19. The wheel chair of claim 13 wherein said latch spring is a pneumatic spring.

20. A wheel chair for transporting and supporting a disabled person on and above a floor and further elevating said wheel chair while said disabled person remains supported by said wheel chair comprising;

a frame, said frame formed by structural members, forming the inner and outer vertical and horizontal peripheries of a chair;

wheel means, mounted on said frame for supporting said frame on said floor and further allowing said wheel chair to transport said disabled person;

an elevation means, with an uppermost portion and a lowermost portion, said elevation means is connected to and is part of said frame;

at least one leg means, with an uppermost end and a lowermost end, slideably connected to said elevation means for elevating and lowering and supporting said frame, said wheel means and said disabled person;

said leg means including at least one spline connected to said leg means, said spline extending from near the uppermost end of said leg means and extending down said leg means parallel to a vertical axis of said leg means to near the lowermost end of said leg means;

said spline further including at least one stop notch cut into said spline;

a latch housing fixed to said lowermost portion of said elevation means;

a ball cylinder formed in said latch housing at a sloping angle of at least one degree off of perpendicular from said vertical axis of said leg means, said sloping angle to be sloping away from said axis of said vertical leg means;

a plug said plug fixed at the lower end of said ball cylinder;

a ball, said ball with a diameter slightly less than the diameter of said ball cylinder, and said ball to be held at rest against said plug when said vertical axis of said leg means is perpendicular to said floor when said floor is level, and said ball further rolling toward said vertical axis of said leg means when said vertical axis of said leg means is no longer perpendicular to said level floor, causing said ball to roll in said ball cylinder toward said leg means and further causing said ball to roll into said stop notch as said wheel chair is being elevated and lowered, and further jambing said ball between said ball cylinder and said stop notch thus preventing said wheel chair from being further elevated and further lowered.

21. The wheel chair of claim 20 wherein said ball cylinder has at least one ball notch at the inside end of said ball cylinder.

22. The wheel chair of claim 20 wherein said ball is a roller.

23. The wheel chair of claim 20 wherein said stop notch has radius at least equal to that of said ball.

* * * * *